United States Patent [19]

Runkle et al.

[11] Patent Number: 4,652,058
[45] Date of Patent: Mar. 24, 1987

[54] DECELERATION AND PRESSURE SENSITIVE PROPORTIONING VALVE WITH HIGH PRESSURE DAMPING

[75] Inventors: Dean E. Runkle, LaPorte, Ind.; Robert F. Gaiser, Stevensville, Mich.

[73] Assignee: Allied Corporation, Morristown, N.J.

[21] Appl. No.: 738,116

[22] Filed: May 24, 1985

[51] Int. Cl.$^4$ .............................................. B60T 8/26
[52] U.S. Cl. .................................. 303/6 C; 303/24 F
[58] Field of Search .................... 303/6 R, 6 C, 22 R, 303/24 A, 24 C, 24 F, 56

[56] References Cited

U.S. PATENT DOCUMENTS

| | | | |
|---|---|---|---|
| 3,317,251 | 5/1967 | Hambling et al. | 303/24 A |
| 4,159,855 | 7/1979 | Falk | 303/24 F |
| 4,351,570 | 9/1982 | Young | 303/6 C X |
| 4,411,477 | 10/1983 | Burgdorf | 303/6 C X |
| 4,462,641 | 7/1984 | Inoue | 303/6 C X |
| 4,477,123 | 10/1984 | Schnurer | 303/24 R |

FOREIGN PATENT DOCUMENTS 2023248  12/1979  United Kingdom.

OTHER PUBLICATIONS

*Inertia Valves for Braking Systems* by A. J. Young, IMech E1983, pp. 19–24.

*Primary Examiner*—Duane A. Reger
*Attorney, Agent, or Firm*—Larry J. Palguta; Ken C. Decker

[57] ABSTRACT

A proportioning valve assembly (10, 210) in a housing (12, 212) is pressure responsive to control the flow of fluid to a wheel brake cylinder. The proportioning valve (20, 220) is connected to a fluid channel (31, 231) opening into a reservoir (13, 213), a second valve (34, 234) being disposed in the channel (31, 231) and being engaged by an inertia sensitive ball (40, 240) located either on a ramp (17) or within a recess (235) of the second valve (234). The ball (40) is responsive to deceleration of the vehicle and moves up the ramp (17), or the ball (240) moves multi-directionally from the recess (235) to be both longitudinal and lateral deceleration responsive. Movement of the ball (40, 240) permits the second valve (34, 234) to close and prevent fluid communication between the fluid reservoir (13, 213) and the proportioning valve (20, 220) in order to vary the outlet pressure of the proportioning valve (20, 220) in response to deceleration or cornering of the vehicle. The proportioning valve (20, 220) includes a second piston (80, 280) which has a plunger end (82, 282) that extends within the channel (31, 231) and a bore (303) of a sleeve (301). The sleeve (301) has an orifice (307) to restrict fluid pressure flow from the bore (303) around the plunger end (282) and through the orifice (107, 307) to the channel (31, 231). The sleeve (301), orifice (307), and plunger end (82, 282) provide damping of second piston when sudden high pressure applications occur, and thereby eliminate the occurrence of wheel lock-up.

34 Claims, 7 Drawing Figures

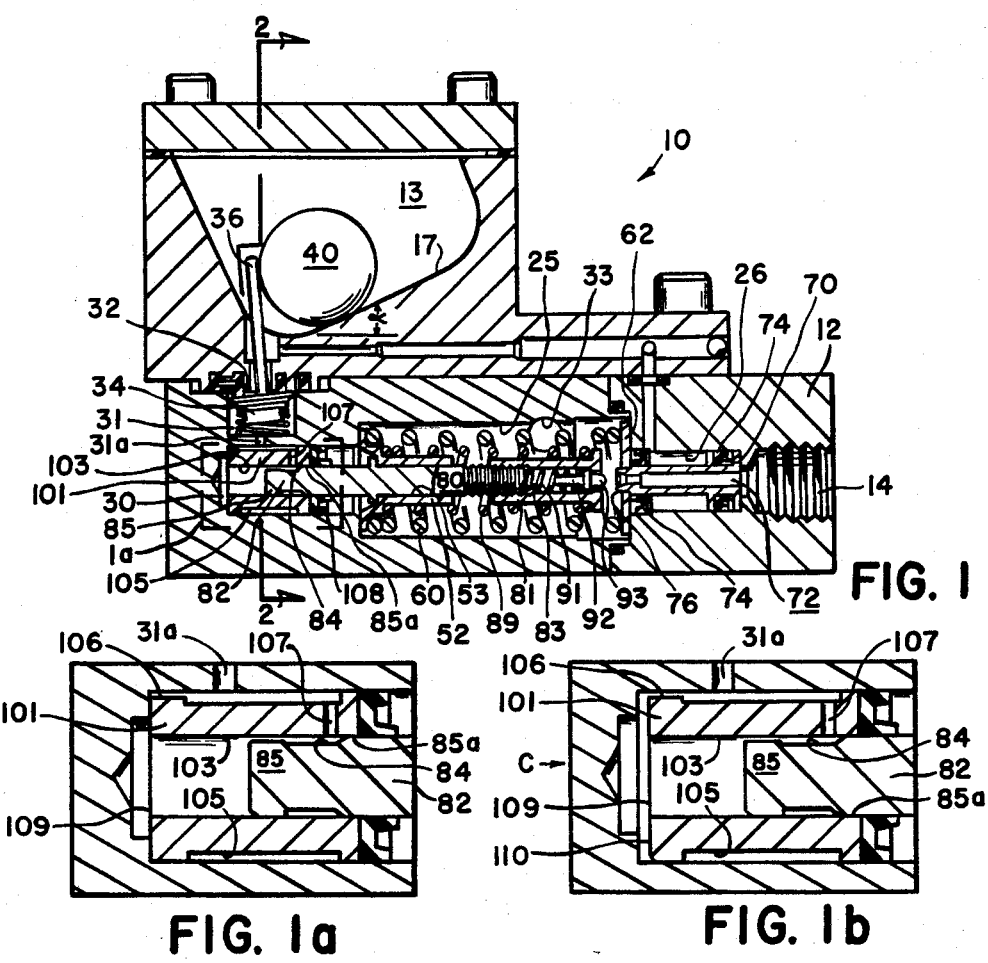
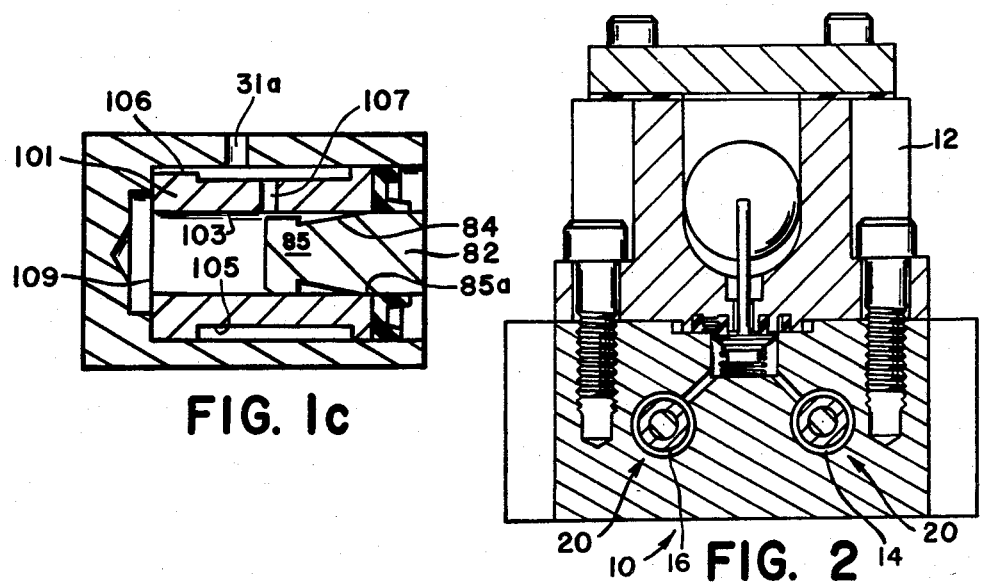

4,652,058

DECELERATION AND PRESSURE SENSITIVE PROPORTIONING VALVE WITH HIGH PRESSURE DAMPING

This invention relates to a deceleration and pressure sensitive proportioning valve for the brake system of a vehicle, with a damping assembly provided in order to optimize braking presure. U.S. Pat. No. 4,595,243 filed Sept. 10, 1984 and entitled "Deceleration and Pressure Sensitive Proportioning Valve" discloses a proportioning valve assembly which may be disposed entirely within the body of the master cylinder, and provides for deceleration and pressure sensitive response in order to reduce the fluid pressure communicated to the rear wheels. By reducing brake fluid pressure applied to the rear wheels in loaded and unloaded vehicle situations, appropriate braking pressures are communicated to the rear wheels in accordance with vehicle loading so that braking distance will be shortened and wheel lock-up and subsequent skidding is eliminated or minimized. During sudden emergency situations, a vehicle operator may suddenly apply full braking force to the brake pedal and cause a very quick increase of pressure within the braking system. Within a matter of one tenth of a second, the brake fluid can be increased from zero to approximately 1000 PSI. Such a sudden increase in brake fluid pressure resulting from a "spike" apply to the brake pedal, can cause a proportioning valve assembly to operate improperly so that the output pressure overshoots or exceeds the normal level where the proportioning valve would begin to limit the output pressure to the rear wheels. The overshooting or sudden increase in the brake pressure can then cause premature wheel lock-up and potential skidding of the vehicle. It is desirable to provide a means for preventing a sudden increase in brake fluid pressure from overshooting the normal break point of the characteristic curve of the proportioning valve. The present invention provides a solution for preventing pressure overshoot in output brake fluid pressure.

The present invention provides a proportioning valve assembly which includes a housing having an inlet and an outlet, a first piston disposed in the housing and subject to inlet and outlet pressures so that the valve assembly provides a pressure at the outlet reduced from the pressure from the inlet, spring means biasing the first piston toward an end of the housing, a second piston disposed within the housing and movable relative to the first piston, the second piston having an interior cavity, resilient means acting on said second piston, poppet valve means disposed within the interior cavity of the second piston and extendable therefrom, a spring biasing said poppet valve means toward the outlet, channel means for connecting the inside of said housing with a fluid reservoir, second valve means disposed in said channel and including biasing means for biasing seat closure means toward a valve seat in said channel means, an inertia sensitive object engaging said second valve means, the inertia sensitive object disposed within the reservoir and deceleration causing the object to move away from the second valve means which closes to prevent communication with the reservoir and thereby cooperating in reducing pressure at the outlet, the second piston including a plunger end which extends within the channel, and a sleeve disposed within said channel and having an interior bore which receives the end of the plunger therein, the sleeve having an orifice so that fluid flows from the interior bore around the end of the plunger, through the orifice and channel means to the second valve means, the valve assembly being responsive to unloaded and loaded conditions of the vehicle by means of the second valve means and inertia sensitive object.

The accompanying drawings show, for the purpose of exemplification without limiting the invention of the claims thereto, certain practical embodiments illustrating the principles of this invention wherein:

FIG. 1 illustrates in section view a housing having two proportioning valves of the present invention disposed within the body of the housing;

FIG. 1a is an enlarged view illustrating the plunger and sleeve arrangement of the present invention;

FIG. 1b is an enlarged partial view illustrating the operation of the sleeve during release of the brakes and cessation of braking;

FIG. 1c illustrates an alternative embodiment of the sleeve and piston interface;

FIG. 2 is a section view of the end of the housing of FIG. 1;

Figure 4:
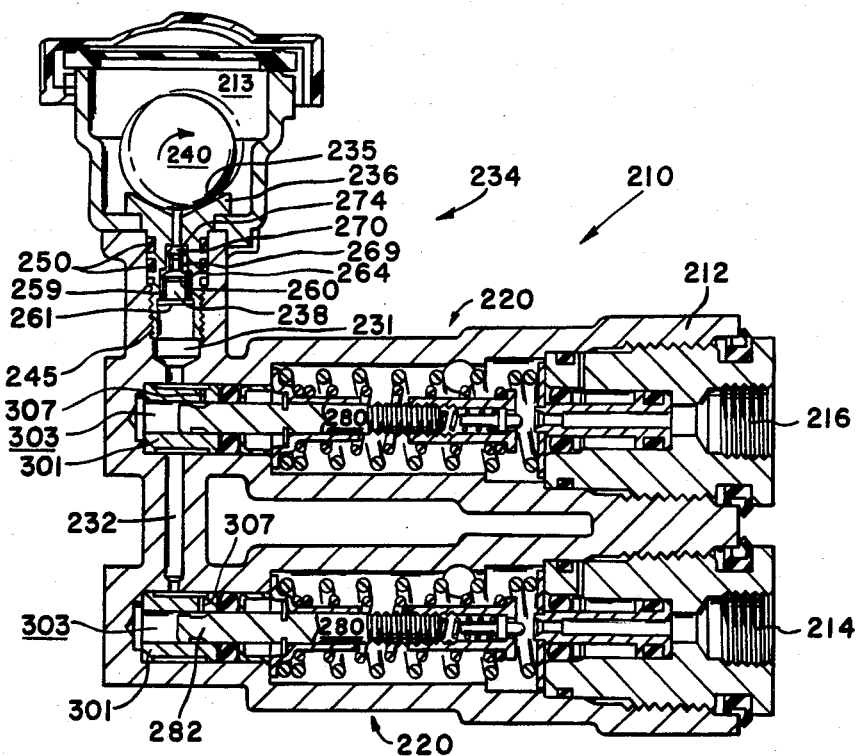
FIG. 4 is a section view of two proportioning valves of the present invention disposed within the body of a housing and illustrating the second valve means supporting thereon an inertia sensitive object.

FIGS. 1-2 illustrate an embodiment of the proportioning valve assembly of the present invention and which is designated generally by the reference numeral 10. The proportioning valve assembly 10 may be contained within a housing 12 that is separate from the body of the master cylinder (not shown). Copending patent application Ser. No. 649,244 discloses a deceleration and pressure sensitive proportioning valve assembly which may be contained within the body of the master cylinder, and said Application is incorporated by reference herein. Alternatively, the present invention may be contained within a housing 12 which is separate from the housing of the master cylinder and which has its own reservoir 13. The proportioning valves 20 (see FIG. 2) contained within the housing 12 are for a split braking circuit having a fluid pressure outlet 14 communicating with a rear wheel cylinder and fluid pressure outlet 16 communicating with the other rear wheel cylinder. Referring to FIG. 1 which illustrates in section view one of the proportioning valves 20, there is illustrated a bore 25 which communicates with the master cylinder (not shown) by means of passageway 33. Bore 25 communicates with a cavity 30 and channel 31 that communicate with a reservoir 13, channel 31 including an opening 32 comprising the opening of a second valve 34 which is illustrated as a tilt valve. Tilt or second valve 34 may comprise any one of numerous valve constructions which would function appropriately in the present invention, and one such alternative second valve embodiment is illustrated in FIG. 4, which will be explained hereinafter. An inertia sensitive ball 40 is located separate from the path of fluid flow through proportioning valve 20 and within reservoir 13 on a ramp 17 which is disposed at an angle alpha oriented upwardly towards the front of the vehicle. Second or tilt valve 34 includes arm 36 engaged by the inertia sensitive ball 40; inertia sensitive ball 40 holds the tilt valve open until a certain predetermined attitude is attained by the vehicle during deceleration or when deceleration displaces ball 40 up ramp 17. Bore 25 includes a reduced diameter portion 26 having a differential piston 70 therein. Differential piston 70 includes through opening 72 providing for communication of outlet 14 with bore 25. Seals 74 are disposed about differential piston 70 which has valve seat 76 extending into bore 25 and with washer 62 disposed thereabout. A first spring 60 biases the washer 62 and differential piston 70 to the right in FIG. 1, with one end of the spring 60 being received by guide 52. A second piston 80 comprises a longitudinal member having one end threadably received in and supporting enclosure 81 and the other end 82 received in cavity 30. Enclosure 81 defines a cavity 83 which contains poppet 92 therein biased by spring 91 towards valve seat 76. The second piston 80 is disposed within a bore 53 of guide 52, so that the piston 80 may slide longitudinally relative to guide 52. Spring 89 seats on guide 52 and biases the second piston to the right in FIG. 1. End 82 of second piston 80 is received within a bore 103 of sleeve 101, and includes a reduced diameter portion 84. Sleeve 101 has a reduced exterior diameter portion 105 containing therein an orifice 107. Seal 108 provides sealing engagement between second piston end 82 and the walls of cavity 30.

The proportioning valves 20 contained with housing 12 operate in accordance with the performance characteristics disclosed within copending and incorporated patent application Ser. No. 649,244. Pressurized brake fluid received from inlet 33 passes through valve seat 76 and opening 72 to outlet 14 and to the wheel cylinder of a rear wheel brake. When the inlet pressure rises to a level sufficient to displace differential piston 70 to the left in FIG. 1, valve seat 76 moves toward poppet end 93 to cause restriction of the brake fluid and pressure communicated through opening 72 to the rear wheel brake. This establishes a first brake point and if deceleration of the vehicle is sufficient to cause the inertia sensitive ball to roll up ramp 17 (indicating an unloaded vehicle), then valve 34 closes and the closed channel 31 prevents movement to the left of second piston 80. Poppet valve 92 remains stationary so that end 93 restricts seat 76 and the output pressure is metered accordingly. If deceleration of the vehicle is insufficient to cause the ball 40 to roll up ramp 17 and close valve 34, then the increased inlet pressure will cause the second piston 80 to move to the left against coil spring 89. As second piston 80 moves to the left, poppet valve 92 moves therewith to retract seat end 93 away from valve seat 76 and allow the increased input pressure to be communicated through opening 72 to the rear brake wheel cylinder. This results in an increase in the output pressure which increases the braking of the vehicle until the deceleration causes the ball 40 to roll up ramp 17. Closure of the tilt valve 34 prevents any fluid communication from cavity 30 and channel 31 to reservoir 13, and thereby prevents second piston 80 from moving any further to the left. As piston 70 moves to the left in accordance with the increase in input pressure, seat 76 again approaches the valve seat end 93 and establishes a higher level brake point for a loaded vehicle. The restriction of fluid flow through valve seat 76 by poppet end 93 results in a pressure curve for a loaded vehicle. The operational characteristics of the present invention are identical to that disclosed in previous copending application Ser. No. 649,244, and the present invention also includes an improved damping means for accommodating sudden high pressure application or "spike" applies imposed upon the braking system. The proportioning valve of the present invention includes the same inherent by-pass system provided for the previous described patent application, wherein if one of the branches of the split circuit should fail, then there would be less deceleration of the vehicle and the tilt valve of the operative branch would stay open so that a higher brake fluid pressure received from the master cylinder can be communicated to the associated brake cylinders. Thus, in case of failure, higher braking pressures can be communicated to the associated brake wheel cylinder to effect braking of the vehicle, and likewise for a system with a single proportioning valve.

Figure 3:
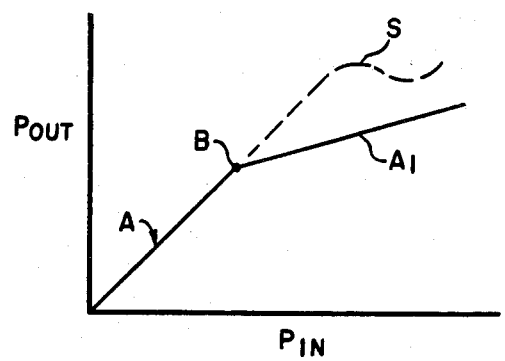
FIG. 3 is a graph of $P_{out}$ versus $P_{in}$ for the proportioning valve of the present invention.

The proportioning valve 20 of the present invention includes a sleeve 101 which provides for damping when a "spike" apply is imposed upon the brake system. In the event of an emergency situation, the vehicle driver may suddenly apply with full force the brake pedal. This can cause the brake pressure to be increased from zero to approximately one thousand pounds per square inch within a matter of approximately one tenth of a second. FIG. 3 illustrates the pressure output $P_{out}$ of the braking system communicated to the rear wheel brake cylinder in relationship to the pressure input $P_{in}$ to the braking system. Curve A represents an equal pressure output for an equal pressure input during the initial phase of braking, and when a first brake point B is reached in accordance with the normal braking conditions stated above, the curve should proceed in accordance with curve A1. However, a "spike" or sudden high pressure application of the braking system can cause the braking pressure to overshoot the brake point B and follow the dotted line curve S. When the characteristic curve takes the form of curve S and exceeds the desired pressure output curve A1, wheel lock-up will most likely occur and steerable control of the vehicle will be lost. In proportioning valve 20, the sudden application of a high fluid pressure through inlet 33 to bore 25 could cause the second piston 80 to move suddenly to the left, which correspondingly would cause the poppet end 93 to move away from valve seat 76 and permit the full "spike" applied fluid pressure to be communicated to the associated rear brake. In order to prevent this, sleeve 101 is disposed about end 82 of second piston 80. The sudden increase in brake pressure applied to bore 25 will move the piston 80 to the left of FIG. 1, but end 82 will compress the brake fluid within bore 103 of sleeve 101. As illustrated in FIG. 1a, the dimensions and tolerances of the sleeve 101 and end 182 are closely controlled so that there is a slight gap or clearance between bore 103 and end portion 85. The fluid flows from bore 103 around end 85 to reduced diameter portion 84, through orifice 107 to exterior reduced diameter portion 105 and into channel 31. By restricting the flow of fluid through sleeve 101 and orifice 107, there is a damping effected for second piston 80. Because piston 80 cannot move quickly to the left, the poppet end 93 remains adjacent the differential piston 76 and effectively meters the outlet fluid pressure communicated through outlet 14. As a result, the characteristic curves described above and in previous copending application Ser. No. 649,244 are achieved and the output curve S is avoided. It has been found that proportioning valve 20 of the present invention improves the stopping distance of a vehicle, while minimizing wheel lock-up. as a result, the driver may initiate a "spike" force application of the brake pedal with the resulting creation of exceedingly high fluid pressures within the proportioning valve 20, and obtain the predetermined output characteristics which are desirable for both loaded and unloaded vehicle braking. Additionally, the present invention continues to provide an inherent bypass feature in case one of the braking circuits in a split circuit system would fail.

The reduced diameter portion 84 and orifice 107 utilize a lap-land approach for restricting fluid flow. In other words, the movement of piston end 82 to the left will cause the reduced diameter portion 84 to move out of alignment with the orifice 107. Fluid still flows around the end 85 through reduced diameter portion 84 to the orifice 107, but it is greatly slowed by the presence of the larger diameter area 85a being disposed adjacent the orifice 107. In addition, the orifice 107 is offset from the opening 31a which further restricts fluid flow and pressure drop by providing multiple orifices (107 and 31a) in series in accordance with the principles of fluid flow.

FIG. 1b illustrates movement of sleeve 101 to the right in the direction of arrow C when a brake application is being discontinued. When a brake application is discontinued, the pressure within bore 25 decreases rapidly and significantly to the extent there may be a slight vacuum within bore 25. Piston 80 will return towards the right if there is a sufficient replenishment of brake fluid within the chamber 30 and bore 103 of sleeve 101. In order to effect this so that the return of piston 80 is not delayed, sleeve 101 moves to the right under the effect of higher pressure in chamber 30 and bore 103 than in bore 25, so that brake fluid may flow from channel 31 through opening 31a to exterior reduced diameter portion 105, around sleeve end 110 and into opening 109 in order to replenish the supply of brake fluid within bore 103. Thus, the movement of sleeve 101 to the right alleviates any replenishment problem which might greatly slow the return of second piston 80 to its proper at rest position.

FIGS. 1 and 2 illustrate the inertia sensitive ball 40 disposed on the U-shaped ramp 17 which enables directional control of ball 40. The ramp 17 may contain one or more lateral sides in order to limit, in one or more directions, the travel of ball 40 during deceleration, and thereby provide deceleration and transverse acceleration dependent control. The ramp 17 can be disposed in any direction relative to the longitudinal axis of proportioning valve 20. Also, separate balls 40 and second valves 34 can be provided for the proportioning valves 20 in order to provide deceleration and transverse acceleration dependent controlled braking fluid pressures for the individual brakes.

FIG. 1c illustrates an alternative embodiment of sleeve 101 wherein orifice 107 is aligned with end 85 of piston 82 and reduced diameter portion 84 is formed in the shape of a beveled opening. During a normal application of the brakes, there is little difference in the functional characteristics exhibited by the sleeve-piston interfaces of FIGS. 1a and 1c. During a "spike" application of the brakes, the alignment of orifice 107 with piston end 85 results in an immediate restriction of fluid flowing through orifice 107 as end 85 moves by the orifice, and the desired damping effect is achieved. After an initial period of time and when fluid pressures begin to approximate normal braking pressures, piston 82 has moved to the left in FIG. 1c so that reduced diameter portion 84 aligns with orifice 107 and fluid flow through orifice 107 is less restricted. This results in piston 82 moving further to the left before the larger diameter area 85a is disposed adjacent orifice 107 to restrict fluid flow through the orifice and effect a knee-point or break-point in the characteristic output curve. Thus, a higher break-point is achieved on the characteristic output curve, and, of course, greater spacing achieved between the break-points of the output curve.

Referring now to FIG. 4, there is illustrated an alternative embodiment of the second valve or tilt valve 34 of FIG. 1. Similar components are identified by the same numerals increased by 200. Like the previous embodiment, the inertia sensitive ball is disposed in a location that is separate from the fluid flow path leading from the master cylinder to the associated rear brake. Thus, the inertia sensitive ball is not subject to fluid flow characteristics that occur within the fluid flow path during braking. Second valve 234 comprises an annular ball 240 disposed within a cavity or recess 235 of valve body 236. Valve body 236 including a stepped opening 238 which communicates with channel 231. The proportioning valves 220 illustrated in FIG. 4 are identical to the proportioning valves 20 illustrated in the previous Figures, and are connected together by channel 232. Body 236 includes threads 245 which are threadedly engaged with complementary threads of housing 212. O-ring seals 250 are disposed about body 236 in order to provide a seal between the housing 212 and body 236. Stepped opening 238 includes two valving members 260 and 270 in serial alignment with respective valve seats 264 and 274. Spring 259 is positioned on clip 261 so as to bias valve member 260 toward ball 240 and into engagement with valve 270, valve 270 being biased by spring 269 seated on valve member 260 so as to bias the valve member 270 into engagement with ball 240.

It is important that the valve 234 operate properly in order to insure that at the appropriate, predetermined times valve 234 closes and enables the appropriate characteristic curve break points to be achieved. If the second valve in channel 31 should be damaged or leak, the leakage of fluid pressure into reservoir 213 would change the operational characteristics of proportioning valves 220 and correspondingly change the output braking pressures communicated through outlets 214 and 216. Therefore, serially aligned valve members 260 and 270 provide a redundant or dual valving arrangement to assure that second valve 234 always operates properly. Valve member 260 is positioned slightly closer to valve seat 264 than valve member 270 is positioned to valve seat 274. As a result, when longitudinal or lateral deceleration of the vehicle causes the ball 240 to move from the recess 235, the valve member 260 will close seat 264 before the valve member 270 closes seat 274. If there should be any leakage of fluid around valve seat 264, the fluid pressure exerted against valve member 270 along with the spring load of spring 269 and increased travel of ball 240, will cause valve member 270 to seat against valve seat 274 and effect closure of second valve 234. Because second valve 234 always operates properly, it is not possible for second pistons 280 to move improperly to the left in FIG. 4 and permit greater than desired output pressures to be supplied through outlets 214 and 216 to the rear brakes. Thus, the desired output pressures are assured by the serial valving arrangement of second valve 234.

Ball 240 depresses the valve members 260 and 270 downwardly against their respective springs 259 and 269. Ball 240 is responsive not only to deceleration, but is responsive to sharp cornering of the vehicle. The avoidance of excessive braking pressures should be accomplished not only during longitudinal deceleration of the vehicle, but also during lateral deceleration when the vehicle is rounding a curve. A wheel lock-up occurring when the vehicle is rounding a curve, or cornering, can cause loss of control of the vehicle. Thus, ball 240 is movable in any lateral direction relative to recess 235. The multi-directional movement capability of ball 240 renders second valve 234 responsive vectorily both to longitudinal deceleration and lateral deceleration of the vehicle. Because of the law of linear progression, ball 240 will tend to proceed or transversely accelerate along a straight line comprising a tangent to the curve of the vehicle's path, so ball 240 moves from recess 235 and permits valve members 260 and 270 to operate. Thus, the present invention provides a deceleration and pressure sensitive proportioning valve with a damping assembly which eliminates excessively high braking pressures during a "spike" application of the brake pedal and also during cornering of the vehicle by means of the appropriate operation of proportioning valves 220 in cooperation with second valve 234. Lateral sides or walls can be added as guides that limit the movement of ball 240 in one or more directions so that the operation of ball 240 is dependent upon the direction of deceleration or transverse acceleration. As previously described, a separate ball 240 and second valve 234 can be provided for each proportioning valve 220 in order to provide deceleration and transverse acceleration dependent braking pressure for the individual wheels.

Although this invention has been described in connection with the illustrated embodiments, it will be obvious to those skilled in the art that various changes may be made in the form, structure, and arrangement of parts without departing from the invention.

We claim:

1. In a proportioning valve assembly for a vehicle having an inlet communicating with a fluid pressure source and an outlet communicating with a brake assembly, a pressure responsive assembly cooperating with the inlet and the outlet to vary fluid communication therebetween in response to pressurized fluid communicated to the inlet, an inertia sensing mass responsive to deceleration of the vehicle and cooperating with the pressure responsive assembly to assist in the variation of fluid communicated between the inlet and the outlet, a fluid reservoir communicating with the pressure responsive assembly, a channel providing the communication between the pressure responsive assembly and the fluid reservoir, valve means disposed in said channel between the inlet and reservoir and engaged by said inertia sensing mass, and means for damping high pressure responsive operation of said pressure responsive assembly, said damping means disposed within said channel and slowing high pressure responsive operation of the pressure responsive assembly so that said pressure responsive assembly is capable of varying fluid pressure communicated to said outlet.

2. The proportioning valve assembly in accordance with claim 1, wherein said pressure responsive assembly includes a differential piston in a bore of the valve assembly, a second piston located for movement relative to the differential piston, and poppet valve means disposed for cooperation with the differential piston.

3. The proportioning valve assembly in accordance with claim 2, wherein the damping means comprises sleeve means disposed within said channel, and said second piston extends into said channel and sleeve means.

4. The proportioning valve assembly in accordance with claim 3, wherein said second piston comprises a plunger end which extends within an interior bore of said sleeve means, the plunger end having a reduced diameter portion, the sleeve means having an exterior reduced diameter portion and an orifice which communicates with the interior bore of the sleeve means.

5. The proportioning valve assembly in accordance with claim 4, wherein said orifice is in alignment with said reduced diameter portion of the plunger end of said second piston when the second piston is at rest, movement of the plunger end relative to the sleeve means causing the reduced diameter portion of the plunger end to be non-aligned with said orifice.

6. The proportioning valve assembly in accordance with claim 4, wherein said orifice is aligned with said plunger end so as to communicate directly with the interior bore when the second piston is at rest, movement of the plunger end relative to the sleeve means causing the reduced diameter portion of the plunger end to align with said orifice.

7. The proportioning valve assembly in accordance with claim 1, wherein said pressure responsive assembly, damping means, channel, and valve means define a fluid communication path which permits fluid flow from the interior of the damping means past a portion of the pressure responsive assembly, through the damping means, to the channel means, past the valve means and into the reservoir.

8. The proportioning valve assembly in accordance with claim 7, further comprising guide means disposed about said second piston, the guide means providing for guiding longitudinal movement of said second piston and providing a seat for resilient means.

9. The proportioning valve assembly in accordance with claim 1, wherein said engagement of the valve means and inertia sensing mass provides for multidirectional movement of the mass relative to the valve means.

10. The proportioning valve assembly in accordance with claim 1, wherein the valve means comprises serially aligned valve members and valve seats.

11. The proportioning valve assembly in accordance with claim 1, wherein the inertia sensing mass is disposed adjacent at least one guide means for controlling a direction of movement of said mass.

12. A pressure reducing valve assembly for a vehicle braking system, comprising a housing having an inlet and an outlet, a differential piston in said housing and subject to inlet and outlet pressures so that the valve assembly provides a pressure at said outlet reduced from the pressure at said inlet, a second piston disposed within said housing and movable relative to said differential piston, said second piston having an interior cavity, poppet valve means disposed within the interior cavity of said second piston and extendable therefrom, channel means for connecting the inside of said housing with a fluid reservoir, second valve means disposed in said channel means, an inertia sensitive object engaging said second valve means, sleeve means disposed within said channel means and receiving an end of said second piston therein, the inertia sensitive object being responsive to deceleration of the vehicle to close said second valve means and prevent fluid communication with said reservoir and cooperatingly reduce pressure at the outlet, and said sleeve means damping the movement of the second piston by restricting the flow of fluid between said sleeve means and the end of the second piston.

13. The pressure reducing valve assembly in accordance with claim 12, wherein the sleeve means includes an interior bore receiving therein the end of said second piston, and an orifice communicating with the interior bore, so that fluid within the interior bore of the sleeve means and compressed by movement of the end of the second piston flows around the end of the second piston, through said orifice to said channel.

14. The pressure reducing valve assembly in accordance with claim 13, wherein said pressure reducing valve assembly includes guide means disposed about said second piston, the guide means for guiding longitudinal movement of the second piston and providing a seat for resilient means.

15. The pressure reducing valve assembly in accordance with claim 13, further comprising seal means disposed at an end of said sleeve means, the sleeve means movable in response to fluid pressure changes occurring during the cessation of braking so that fluid pressure from said reservoir flows through said channel and around an end of said sleeve means in order to replenish fluid within said interior bore.

16. The pressure reducing valve assembly in accordance with claim 13, wherein said second valve means comprises tilt valve means biased in an open direction by said inertia sensitive object in the absence of deceleration.

17. The pressure reducing valve assembly in accordance with claim 16, further comprising resilient means disposed about said second piston and exerting a biasing force against said differential piston.

18. The pressure reducing valve assembly in accordance with claim 12, wherein the end of said second piston includes a reduced diameter portion aligned with an orifice in said sleeve means, the reduced diameter portion of the second piston and orifice restricting and slowing fluid flow along a path through said sleeve means, around the end of said second piston, through said orifice, and to said channel.

19. The pressure reducing valve assembly in accordance with claim 18, wherein the sleeve means includes an exterior reduced diameter portion in communication with the orifice, the end of the second piston movable relative to the sleeve means to restrict and slow fluid flow through the orifice and channel means.

20. The pressure reducing valve assembly in accordance with claim 12, further comprising a connection leading from said channel means to a second pressure reducing valve assembly for the vehicle braking system.

21. The pressure reducing valve assembly in accordance with claim 12, wherein the end of the second piston includes a reduced diameter portion and the sleeve means includes an orifice aligned with the end of the second piston so as to communicate directly with an interior bore of the sleeve means when the second piston is at rest, movement of the ends relative to the sleeve means causing the reduced diameter portion of the second piston to align with said orifice.

22. The pressure reducing valve assembly in accordance with claim 12, wherein the inertia sensitive object is disposed adjacent directional guide means for controlling a direction of movement of said object.

23. In a proportioning valve assembly for a vehicle having an inlet communicating with a fluid pressure source and an outlet communicating with a brake assembly, a pressure responsive assembly cooperating with the inlet and the outlet to vary fluid communication therebetween in response to fluid communicated to the inlet, an inertia sensing mass responsive to deceleration of the vehicle and cooperating with the pressure responsive assembly to assist in the variation of fluid communication between the inlet and outlet, a fluid reservoir communicating with the pressure responsive assembly, a channel which provides the communication between the fluid reservoir and the pressure responsive assembly, and valve means disposed within said channel and engaged by said inertia sensing mass, said valve means supporting said inertia sensing mass for multi-directional movement relative to the valve means, the valve means having an area receiving the inertia sensing mass thereat to engage valve closure means disposed within said valve means, predetermined motion of said vehicle causing said inertia sensing mass to move away from said valve means so that said valve closure means closes the valve means to prevent fluid communication with the fluid reservoir so that the valve means cooperates with the pressure responsive assembly in the variance of fluid communicated to said outlet.

24. The proportioning valve assembly in accordance with claim 23, wherein the valve closing means comprises two valve closing members each aligned with respective valve seats in said valve means, movement of the inertia sensitive mass enabling the valve members to close the valve seats.

25. The proportioning valve assembly in accordance with claim 24, wherein said area comprises a recess and said inertia sensing mass comprises a generally circular ball which may move multi-directionally from said recess and allow said valve closing members to close said valve seats.

26. The proportioning valve assembly in accordance with claim 25, further comprising resilient means biasing said valve closing members towards closure of said valve seats, the valve closing members being aligned serially with a first valve member engaging said ball.

27. The proportioning valve assembly in accordance with claim 24, further comprising a shoulder within said valve means which provides support for a first resilient means which biases a second one of said valve members toward the respective valve seat, and the second valve member providing a shoulder for second resilient means which biases said first valve member towards closure of the respective valve seat.

28. The proportioning valve assembly in accordance with claim 23, further comprising directional guide means for preventing movement of said inertia sensing mass in at least one direction.

29. A pressure reducing valve assembly for a vehicle braking system, comprising a housing having an inlet and an outlet, a first piston in said housing and subject to inlet and outlet pressures so that the valve assembly provides a pressure at said outlet reduced from the pressure at said inlet, spring means biasing said first piston toward and end of said housing, a second piston disposed within the housing and movable relative to said first piston, said second piston having an interior cavity, resilient means acting on said second piston, poppet valve means disposed within an interior cavity of said second piston and extendable therefrom, a spring biasing said poppet valve means towards said outlet, channel means for connecting the inside of said housing with a fluid reservoir, second valve means disposed in said channel means and including resilient means that biases seat closure means towards a valve seat in said channel means, an inertia sensitive object engaging said second valve means, an end of said second piston extending within said channel means, damping means disposed within said channel means and surrounding said end of said second piston, the inertia sensitive object disposed within said reservoir and one of deceleration and cornering causing said object to move away from said second valve means which closes to prevent fluid communication with said reservoir so that the second valve means cooperates in reducing pressure at said outlet, the damping means preventing sudden longitudinal movement of said second piston means in response to a sudden high pressure application of said vehicle braking system so that resulting slow movement of the second piston means enables the reduction of pressure communicated through said outlet.

30. The pressure reducing valve assembly in accordance with claim 29, wherein the second valve means supports said inertia sensitive object for multidirection movement relative thereto.

31. The pressure reducing valve assembly in accordance with claim 29, wherein the seat closure means and valve seat comprise serially aligned valve members and respective valve seats.

32. The pressure reducing valve assembly in accordance with claim 31, wherein the inertia sensitive object comprises an annular object.

33. The pressure reducing valve assembly in accordance with claim 29, further comprising a connection leading from said channel means to a second pressure reducing valve assembly for the vehicle braking system.

34. The pressure reducing valve assembly in accordance with claim 29, further comprising directional guide means for preventing movement of said inertia sensitive object in at least one direction.

* * * * *